United States Patent
Al-Hokayem

(10) Patent No.: US 10,020,753 B2
(45) Date of Patent: Jul. 10, 2018

(54) HYBRID CONTROL METHOD FOR AN ELECTRICAL CONVERTER

(71) Applicant: ABB Schweiz AG, Baden (CH)

(72) Inventor: Peter Al-Hokayem, Baden-Daettwil (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/804,713

(22) Filed: Nov. 6, 2017

(65) Prior Publication Data

US 2018/0062531 A1    Mar. 1, 2018

Related U.S. Application Data

(63) Continuation of application No. PCT/EP2016/057739, filed on Apr. 8, 2016.

(30) Foreign Application Priority Data

May 5, 2015  (EP) .................................... 15166390

(51) Int. Cl.
   *H02M 5/44* (2006.01)
   *H02M 1/00* (2006.01)
   *H02M 1/12* (2006.01)

(52) U.S. Cl.
   CPC ............... *H02M 5/44* (2013.01); *H02M 1/12* (2013.01); *H02M 2001/0048* (2013.01); *H02M 2001/0067* (2013.01)

(58) Field of Classification Search
   CPC ...... H02M 1/12; H02M 5/458; H02M 5/4585; H02M 2001/0048; H02M 2001/0067
   See application file for complete search history.

(56) References Cited

U.S. PATENT DOCUMENTS

| | | | | |
|---|---|---|---|---|
| 4,855,652 | A | * | 8/1989 | Yamashita .......... H02M 1/4225 318/268 |
| 5,083,039 | A | * | 1/1992 | Richardson .......... F03D 7/0272 290/44 |

(Continued)

FOREIGN PATENT DOCUMENTS

| EP | 2733842 A1 | 5/2014 |
|---|---|---|
| WO | 2014090886 A2 | 6/2014 |

(Continued)

OTHER PUBLICATIONS

European Patent Office, International Search Report & Written Opinion issued in corresponding Application No. PCT/EP2016/057739, dated Jun. 21, 2016, 16 pp.

(Continued)

*Primary Examiner* — Yusef A Ahmed
(74) *Attorney, Agent, or Firm* — Taft Stettinius & Hollister LLP; J. Bruce Schelkopf

(57) ABSTRACT

The present application is directed to an electrical converter having at least one of an active rectifier and an inverter interconnecting an electrical source with an electrical load. A method for controlling the electrical converter includes receiving at least one estimated control variable, receiving at least one outer loop control variable provided by an outer control loop and determining a control region based on a control error and selecting control parameters based on the control region. The control method then predicts at least one reference control value based on a solution of a physical model of the electrical converter. The solution is based on a constraint that minimizes a difference between the at least one estimated control variable and the at least one outer loop control variable. The control method then determines switching states of the electrical converter based on the reference control value.

20 Claims, 3 Drawing Sheets

(56) References Cited

U.S. PATENT DOCUMENTS

| | | | | |
|---|---|---|---|---|
| 5,585,708 | A * | 12/1996 | Richardson | H02M 5/4585 318/722 |
| 6,219,237 | B1 | 4/2001 | Geusic et al. | |
| 9,461,551 | B2 * | 10/2016 | Pahlevaninezhad | H02S 40/32 |
| 9,819,188 | B1 * | 11/2017 | Pan | H02J 3/36 |
| 2005/0007044 | A1 * | 1/2005 | Qiu | G05B 13/048 318/400.02 |
| 2007/0121354 | A1 * | 5/2007 | Jones | H02M 5/4585 363/47 |
| 2010/0079104 | A1 * | 4/2010 | Becker | H02P 21/30 318/802 |
| 2011/0175354 | A1 * | 7/2011 | Bo | F03D 7/0272 290/44 |
| 2012/0033461 | A1 * | 2/2012 | Papafotiou | H02J 3/36 363/35 |
| 2012/0161685 | A1 * | 6/2012 | Geyer | H02M 1/12 318/503 |
| 2012/0314466 | A1 * | 12/2012 | Goerges | H02M 7/53873 363/78 |
| 2014/0198542 | A1 * | 7/2014 | Swamy | H02M 1/4225 363/37 |
| 2014/0362623 | A1 * | 12/2014 | Farkas | H02J 3/32 363/97 |
| 2015/0091484 | A1 * | 4/2015 | Royak | H02M 5/4585 318/400.26 |
| 2015/0256094 | A1 * | 9/2015 | Chaudhuri | H02M 5/4585 363/35 |
| 2015/0365008 | A1 * | 12/2015 | Ogino | H02M 1/14 363/37 |
| 2015/0381081 | A1 * | 12/2015 | Bhangu | H02P 21/0089 318/400.05 |
| 2016/0276919 | A1 * | 9/2016 | Geyer | H02M 1/08 |
| 2016/0344277 | A1 * | 11/2016 | Peyrl | H02M 1/08 |
| 2016/0359423 | A1 * | 12/2016 | Ohta | H02M 1/12 |

FOREIGN PATENT DOCUMENTS

| | | |
|---|---|---|
| WO | 2015028242 A2 | 3/2015 |
| WO | 2015055444 A1 | 4/2015 |

OTHER PUBLICATIONS

European Patent Office, International Preliminary Report on Patentability issued in corresponding Application No. PCT/EP2016/057739, dated Apr. 24, 2017, 14 pp.

European Patent Office, Extended Search Report issued in corresponding Application No. 15166390.3, dated Feb. 5, 2016, 8 pp.

Depenbrock, M., "Direct Self-Control (DSC) of Inverter-Fed Induction Machine," IEEE Transactions on Power Electronics, vol. 3, No. 4, Oct. 1988, pp. 420-429.

Kail, M. et al., "Improved dynamic operation for direct flux control of active front ends with low switching frequency," 2004 35th Annual IEEE Power Electronics Specialists Conference, Aachen, Germany, 2004, pp. 2533-2539.

Geyer, T. et al., "Model Predictive Pulse Pattern Control," IEEE Transactions on Industry Applications, vol. 48, No. 2, Mar./Apr. 2012, pp. 663-676.

Sapin, A. et al., "Modeling, Simulation and Test of a Three-level Voltage Source Inverter with Output LC Filter and Direct Torque Control," Conference Record of the 2003 IEEE Industry Applications Conference, 38th IAS Annual Meeting, Salt Lake City, Utah, Oct. 12-16, 2013, vol. 1, pp. 492-498.

Staudt, V., "Dynamic grid-flux-based control for grid connected voltage-source converters," 2010 International School on Nonsinusoidal Currents and Compensation, IEEE, Piscataway, New Jersey, Jun. 15, 2010, pp. 59-68.

* cited by examiner

HYBRID CONTROL METHOD FOR AN ELECTRICAL CONVERTER

FIELD OF THE INVENTION

The invention relates to the field of control of power converters. In particular, the invention relates to a method, a computer program, a computer-readable medium and a controller for controlling an electrical converter. Furthermore, the invention relates to a converter system comprising such an electrical converter.

BACKGROUND OF THE INVENTION

High power electrical motors are usually supplied by so-called medium voltage drives, which are used in various sectors to drive a variety of machines and processes. Such a medium voltage drive or an electrical converter may be characterised by the power flow between the load and a supplying grid and the energy storage provided by the DC link.

In a usual setup, the electrical converter absorbs power from a three-phase AC power source (the electrical grid), stores this power as energy in DC form using capacitors or inductors (i.e. in the DC link), and finally converts this stored energy back to AC form and drives an electric machine.

However, this power flow can be reversed for example when wind energy is harvested, i.e., the wind turbine converts the mechanical power to electric one, this in turn is rectified and stored, and finally the stored DC energy is inverted and fed back to the grid in an AC form. Alternating this power flow at least at the rectifier side or the inverter side may also be possible for short periods of time to allow extra controllability of the drive.

The AC current from the grid is converted into the DC current in the DC link via an active rectifier. The DC current from the DC link is converted into the AC current for the electrical machine via an inverter. These subunits of the electrical converter, the inverter at the machine side and the active rectifier unit on the grid side may be individually controlled so that the inverter delivers the required power to the electrical machine (hence the required torque at a given mechanical speed), and the active rectifier charges the DC link with the required power so that the stored energy remains close to a constant.

In case the capacitive components in the DC link are very large, disturbance on the machine side and the grid side may be ignored as they result in very little ripples in the stored energy. However, if the capacitive elements are undersized, then the utilized control method should be able to provide this constant energy property by design. For example, the controllers for inverter and active rectifier are separately designed with a power feedforward link between them. However, this may be not sufficient for large disturbances.

WO2015/028242 A2 relates to model predictive control of an electrical system comprising a rectifier, an inverter and an electrical load. The controller solves an optimization problem online by predicting a sequence of future states that is optimal with respect to a cost function, which considers the rectifier and the inverter.

U.S. Pat. No. 6,219,237 B1 describes a control method for a converter with an LC filter. This method is also based on comparing measured variables with outer loop control variables and by model predictive control. However, in U.S. Pat. No. 6,219,237 B1, a flux error is correct always with the same method, i.e. with a corrective flux, which is determined from filters and/or regulators.

EP 2 733 842 A1 discloses a further model predictive control method, in which an objective function is optimized iteratively.

A. Sapin et. al., "Modelling, Simulation and Test of a Three-level Voltage Source Inverter with Output Filter and Direct Torque Control", IEEE 2003, Industrial Applications Conference, 38$^{th}$ IAS Annual Meeting, Oct. 12-16, 2003 relates to direct torque control of a specific inverter.

DESCRIPTION OF THE INVENTION

It is an objective of the invention to provide a control method for an electrical converter that can keep the energy stored in a DC link of an electrical converter at a constant level, also when comparable large disturbances on the source and/or load side appear. It is a further objective of the invention to provide a fast, reliable and flexible reacting control method for an electrical converter that is based on optimal control.

These objectives are achieved by the subject-matter of the independent claims. Further exemplary embodiments are evident from the dependent claims and the following description.

A first aspect to the invention relates to a method for controlling an electrical converter. The electrical converter may be a power converter adapted for processing current of more than 100 A and/or voltages of more than 1.000 V. In particular, the method may be used to control medium voltage and high voltage converters. In general, however, the control method may be applied also to low voltage and high voltage applications.

According to an embodiment of the invention, the electrical converter comprises at least one of an active rectifier and an inverter interconnecting an electrical source (such as an electrical grid) with an electrical load, which for example may be an electrical machine or a further electrical grid. An active rectifier and/or an inverter may comprise controllable semiconductor switches that may be opened and closed based on switching signals/states provided by a controller.

The electrical converter furthermore may comprise a DC link interconnecting the active rectifier with the inverter. However, it has to be understood that the control method also may be applied to only an active rectifier and/or an inverter.

According to an embodiment of the invention, the method comprises: receiving at least one estimated control variable, which is estimated from measurement values measured in the electrical converter; receiving at least one outer loop control variable provided by an outer control loop, the at least one outer loop control variable providing a desired steady-state operation point of the electrical converter, determining a control region based on a control error, which is a difference between the at least one estimated control variable and the at least one outer loop control variable, wherein the control region is defined by one or more intervals of one or more control variables, selecting control parameters based on the control region, wherein, when the control error is in an inner control region, first control parameters are selected, and, when the control error is outside the inner control region but inside an outer control region, second control parameters are selected, switching, based on the control error, between two and more control methods, which differ in control parameters, by predicting at least one reference control value based on a solution of a physical model of the electrical converter, which comprises the selected control parameters, the physical model being based on differential equations modelling the at least one estimated control variable and the solution being based on a constraint minimizing a difference between the at least one estimated control variable and the at least one outer loop control variable, and determining switching states of the electrical converter based on the reference control value.

With the method three kinds of variables are used: estimated control variables are determined from measurement values in the electrical converter, the source and/or the load. Outer loop control variables, which may be provided by an outer control loop and/or from a further controller, provide a set point for the current state of the converter. The outer loop control variables may vary slowly with respect to the estimated control variables and therefore may provide a steady-state operation point for the electrical converter, which should be reached by the control method. Both the estimated and the outer loop control variables are input to the controller performing the control method. The reference control variables are the third kind of variables and are output by the respective controller. The reference control variables are determined from the other two kinds of control variables and are used for determining switching states for the active rectifier and/or the inverter.

It has to be noted that the above mentioned control variables also may be called control signals, since they may be input to and output from different controllers.

The control method, which calculates the reference control variables from the estimated and outer loop control variables, depends on one or more control parameters, which are changed based on a difference of the estimated control variables and the outer loop control variables, which difference may be seen as a control error. For example, the reference control variables may be calculated from a set of equations, which depend on the estimated and outer loop control variables and additionally the one or more control parameters. These set of equations may be derived from a physical model of the electrical converter.

In particular, the control error is assigned to a control region, which is assigned to one or more specific control parameters. A control region may be a subset of the set of all possible control variables. For example, a control region may be defined by one or more intervals of one or more control variables.

In other words, based on the control error, the controller may switch between two or more control methods, which are all based on the same calculation scheme, but which differ in specific control parameters, which may have been selected offline. The control method may be of a hybrid nature to better capture the dynamics of the electrical converter, i.e., the control parameters may depend on the estimated control variables. In such a way, the control method and the corresponding controller may react faster and/or more flexible in a situation, when the control error is large.

According to an embodiment of the invention, the physical model provides a linear quadratic problem and the solution of the physical model was determined offline by algebraically solving the linear quadratic problem.

Usually, an optimal control problem in this context comprises a set of discrete time differential equations, which may model the dynamics of the estimated control variables and a performance index/cost function, which may force the estimated control variables in the direction to the outer loop control variables. This cost function may be quadratic in the control variables.

The cost function may be based on one or more matrices of parameters, which matrices are multiplied from the left and right with the control variables. The cost function matrices and/or control parameters are also present in the offline calculated algebraic solution and may be selected online to select a specific behaviour of the control method.

For example, for linear quadratic problems, a number of exact solutions exists, which, however, may not be solved anymore exactly, when further constraints, such as physical limits, are included. Such a physical limit, for example, may the finite power storage capability of a DC link. By using the hybrid control method, also in this context further constraints and/or limits of the physical system may be considered by switching the control parameters.

It has to be understood that the term "offline" may mean that a controller only contains a solution of the model (for example in the form of equations), which has been determined before the programming of the controller. In other words, the control method may not determine the solution during the operation of the electrical converter by approximately solving a set of differential equations (which may be seen as solving the model "online").

However, it also may be possible that the hybrid control method is together with a physical model that is solved online by the controller.

According to an embodiment of the invention, the solution is a matrix equation for the at least one reference control variable, the matrix equation being (linearly) dependent on the at least one outer control variable, the estimated control variable and (not linearly) on the control parameters. For example, the solution may be a solution of the discrete-time algebraic Riccati equation (as described below).

According to an embodiment of the invention, the control region is selected from a set of nested control regions, surrounding a steady-state operation point defined by the outer loop control variable. Usually, the steady-state operation point is defined by the outer loop control parameter, since the control method should generate reference control variables that result in a behaviour of the electrical converter such that the estimated control variables (determined form measurements) reach the outer loop control variables. If one considers the control error (i.e. the difference between the estimated control variables and the outer loop control variables), the steady-state operation point is moved to the origin. Thus, an inner control region may surround the origin and one or more outer control regions may surround the inner control region.

In the case, the control error is in the inner control region, a first set of control parameters may be selected, which, for example, results only in a slow approaching of the estimated control variables towards the outer loop control variables but which may result in low switching losses.

In the case, the control error is outside of the inner control region but inside an outer control region, other control parameters may be used, which result in a more aggressive control with a faster approach of the estimated control variables towards the outer loop control variables.

It has to be understood, that the control method may use not only two but three or more control regions with one or more different control parameters.

According to an embodiment of the invention, the control region is selected from at least two control regions comprising a normal mode control region and an emergency mode control region, in which a DC link voltage has exceeded a predefined threshold value. As described above, the normal mode control region may be assigned to control parameters that, for example, are optimized with respect to switching losses and/or harmonic content of the output currents. However, in the case, when the energy stored in the DC link may be used up, the control method, for example, may slow down the electrical machine and/or may prevent and/or reduce a power flow from the DC link towards the electrical source.

In the case, the method or the corresponding controller controls both the active rectifier and the inverter, a coordinated control problem for the full electrical converter may be solved. The active rectifier (for converting an AC current from the electrical source into a DC current) and the inverter (for converting the DC current into an AC current to be supplied to a load) may be considered in the mathematical model and a solution optimizing the control problem with respect to both units may be determined.

When both the rectifier and the inverter are considered, there may be a control variable associated with each of the units, i.e. a rectifier control variable, which may be based on a current through the rectifier and an inverter control variable, which may be based on a torque of an electrical machine (or a virtual torque in the case of a further electrical grid as load). Both control variables may be seen as modelling an electric power flowing into the DC link (either from the source or from the load).

According to an embodiment of the invention, the at least one estimated control variable comprises an estimated rectifier control variable and an estimated inverter control variable, the at least one outer loop control variable comprises an outer loop rectifier control variable and an outer loop inverter control variable, and the at least one reference control variable comprises a reference rectifier control variable and a reference inverter control variable. The three types of control variables are also associated to the rectifier and the inverter.

According to an embodiment of the invention, the at least one estimated control variable comprises an estimated rectifier current and an estimated torque, the at least one outer loop control variable comprises an outer loop rectifier current and an outer loop torque, and the at least one reference control variable comprises a reference rectifier control current and a reference torque.

According to an embodiment of the invention, the physical model is based on a first order differential equation of a current through the active rectifier. For example, the time derivative of the estimated rectifier current may depend linearly on the estimated rectifier current and the outer loop reference current.

According to an embodiment of the invention, the physical model is based on at least a first order differential equation of a torque associated with the electrical load. Also, the time derivative of the estimated torque may depend linearly on the estimated torque and the outer loop torque.

According to an embodiment of the invention, the physical model is based on a first order differential equation of a DC link voltage. The first order differential equation of the DC link voltage may be a linear equation in an estimated voltage in a connection point of the electrical converter to the source and in an estimated speed associated with the electrical load. Also the estimated voltage and the estimated speed may be seen as estimated control variables.

For example, the first order differential equation of the DC link voltage may be based on a difference between a power flow through the rectifier (depending on the estimated voltage) and a mechanical power flow corresponding to the load (depending on the estimated speed).

According to an embodiment of the invention, the at least one reference control variable is input to at least one modulator, which generates switching positions of the active rectifier from a reference rectifier control variable and/or which generates switching positions of the inverter from a reference inverter control variable. For example, the reference rectifier current may be input to a rectifier modulator, which generates switching positions for semiconductor switches of the rectifier and/or the reference torque may be input to an inverter modulator, which generates switching position for semiconductor switches of the inverter.

Further aspects to the invention relates to a computer program, which, when being executed by a processor, is adapted for performing the method of one of the claims and to a computer-readable medium in which such a computer program is stored. A non-volatile computer-readable medium may be a floppy disk, a hard disk, an USB (Universal Serial Bus) storage device, a RAM (Random Access Memory), a ROM (Read Only Memory) and an EPROM (Erasable Programmable Read Only Memory). A computer-readable medium may also be a data communication network, e.g. the Internet, which allows downloading a program code.

A further aspect of the invention relates to a controller, which is adapted for performing the method as described in the above and in the following. For example, such a controller may receive measurement values from the electrical converter, the electrical load and/or the electrical source and may comprise a memory and a processor for performing the above and below described method. It also may be possible that the method is at least partially implemented in hardware, such as a DSP and/or a FPGA.

A further aspect of the invention relates to a converter system, which comprises a controller as described in the above and in the following and an electrical converter controlled by the controller, which at least one of an active rectifier for converting an AC current from an electrical source into a DC current and an inverter for converting a DC current into an AC current to be supplied to an electrical load.

The converter system also may comprise the electrical load, which may be an electrical machine, such as a motor or generator. The machine may be a synchronous, an asynchronous or doubly-fed machine.

For example, the converter system may be used as a drive for mining, marine, power generation, etc.

According to an embodiment of the invention, the converter system further comprises at least one of: a DC link; an input filter and/or transformer interconnecting the active rectifier with the electrical source; and an output filter interconnecting the inverter with the electrical load. The rectifier and the inverter may be interconnected via a DC link. Furthermore, electrical filters, such as LC-Filters, may be used for filtering the AC current from the source and into the load.

According to an embodiment of the invention, the converter system further comprises at least one of: at least two active rectifiers connected in parallel between an input filter and/or an electric transformer and a DC link; at least two inverters connected in parallel to a DC link; and at least two parallel DC links, wherein each DC link is cascade connected between an active rectifier and an inverter.

The inverters and active rectifiers as described herein may be based on different converter topologies such as: 2 level, 3 level, Neutral Point Clamped (NPC), 3 level Active NPC, 5 level ANPC, Modular Multi-Level Converters (MMC), etc.

The control method may be applied to many types of configurations, only the physical model, which models the particular configurations, may have to be adapted to the specific situation. When the physical model is solved offline, only the matrix equation provided by the solution has to be adapted inside the control to the specific configuration. For all the above and below described configurations, a model may be formulated which may be solved as described below and therefore, corresponding control methods and controllers may be provided.

Finally, it has to be understood that features of the method as described in the above and in the following may be features of the computer program, the computer-readable medium, the controller and converter system as described in the above and in the following and vice versa.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Converter System

Figure 1:
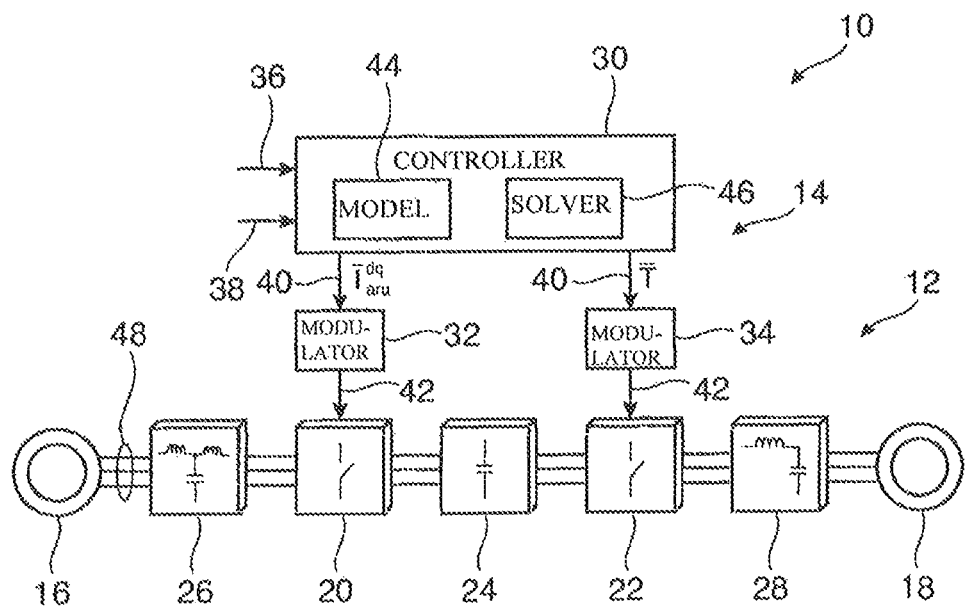
FIG. 1 schematically shows an electrical converter system according to an embodiment of the invention.

FIG. 1 shows an electrical converter system 10 comprising an electrical converter 12 and a controller 14 controlling the converter 12.

The electrical converter 12 is interconnected between an electrical source 16 (such as an electrical grid) and an electrical load 18 (such as a motor) and converts a first AC current of a first frequency into a second AC current of a second frequency. For achieving this, the converter 12 comprises an active rectifier 20 and an inverter 22, which are interconnected via a DC link 24. The rectifier 20 converts the AC of first frequency into a DC current, which is supplied to the DC link 24. The inverter 22 converts the DC current into the second AC current. Furthermore, the electrical converter 12 may comprise an input filter (LC filter) and/or transformer 26 interconnected between the source 16 and the rectifier 20 and an output filter (LC filter) 28 interconnected between the inverter 22 and the load 18.

The controller 14 comprises a hybrid, coordinated controller 30, which operation will be explained in detail in the following and two modulators 32, 34. The controller 30 receives outer loop control variables 36 from an outer control loop, which, for example, set the steady-state operation point of the system 10 and estimated control variables 38, which are determined based on measurements in the system 10, such as current and/or voltage measurements. From these inputs 36, 38, the controller 30 determines reference control variables 40, which in particular may be a reference rectifier current $\bar{I}_{aru}^{dq}$ and a reference torque $\bar{T}$ as output, which are input to a rectifier modulator 32 and an inverter modulator 34, respectively. In general, the reference control variables 40 may be based on an electric power transferred between the source 16 and the DC link 24 and/or an electric power transferred between the load 18 and the DC link 24.

The respective modulators transform the reference control variable 40 into switching states and/or switching positions 42 of the rectifier 20 and the inverter 22. Due to the switching states 42, the state of the electrical system 10 may change, which changes the measurements in the systems 10 and also the estimated control variables 38. In such a way, closed-loop control is established.

For achieving the main control goal, minimizing the difference between the outer loop control variables 36 and the estimated control variables 38, the controller 30 comprises or at least is based on a closed-loop model or physical model 44 of the converter system 10 and a switched solver 46 for the model 44.

Physical Model

Figure 2:
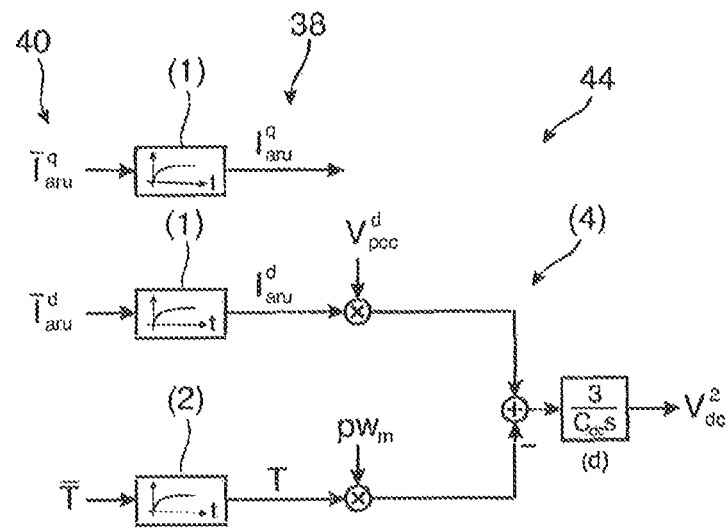
FIG. 2 schematically shows a physical model of an electrical converter used in a control method according to an embodiment of the invention.

FIG. 2 shows details of the physical model 44, which describes the dynamics of the converter system 10. These dynamics capture the physical dynamics of elements 16, 26, 20, 24, 22, 28 and 18 in closed-loop with the modulators 32, 34.

In particular, FIG. 2 depicts the relationship between the reference control variables $\bar{I}_{aru}^{dq}$, $\bar{T}$, the estimated control variables $I_{aru}^{dq}$, $T$ and further quantities as explained below.

The rectifier current $I_{aru}^{dq}$ may be described with following first order differential equation:

$$\frac{d}{dt} I_{aru}^{dq} = -\kappa_{aru} I_{aru}^{dq} + \kappa_{aru} \bar{I}_{aru}^{dq} \tag{1}$$

where $\bar{I}_{aru}^{dq}$ is the output of the controller 30 and consequently the input of the modulator 32. Note that the variables $I_{aru}^{dq}$ and $\bar{I}_{aru}^{dq}$ are vectors with components in d and q and that the d-current controls the active power flow to the DC link.

The estimated torque $T$ may be described with following first order differential equation:

$$\frac{d}{dt} T = -\kappa_{inu} T + \kappa_{inu} \bar{T}, \tag{2}$$

where $\bar{T}$ is the reference torque that is issued from the coordinating controller 30 to the modulator 34. Note that the torque of the electrical machine 18 corresponds to the power flow from and to the DC link 24.

The DC link model may be described with the following dynamics $$\frac{d}{dt}V_{dc} = \frac{1}{C_{dc}}(I_{aru}\cos(\theta_{aru}) - I_s\cos(\theta_{inu})) \quad (3)$$

where $C_{dc}$ is the total capacitor value in the DC link 24, $\theta_{aru}$ and $\theta_{inu}$ are the angles between the voltage and current in the rectifier 20 and the inverter 22, respectively. Essentially, this projection operation would render the physical model 44 nonlinear.

Instead of dealing with a nonlinear system, $V_{dc}^2$ may be considered as a state, and the dynamics around $V_{pcc}$ and $\omega_m$ may be linearized. $V_{pcc}$ is the voltage at the Point of Common Coupling (PCC) or connection point 48 of the electrical system 10 to the source 16. $\omega_m$ is the mechanical speed of the electrical machine 18. Moreover, the phase-locked loop (PLL) on the side of the rectifier may be aligned to the voltage $V_{pcc}$ in order to obtain the following linearized dynamics for the DC link 24:

$$\frac{d}{dt}V_{dc}^2 = \frac{1}{C_{dc}}(3V_{pcc}^d I_{aru}^d - 3\omega_m T), \quad (4)$$

The term $3v_{pcc}^d i_{aru}^d$ in the per unit system represents the electrical power flow on the side of the rectifier 20, while the term $3\omega_m T$ represents the mechanical power flow on the side of the inverter 22.

In order to define the physical model 44 in the overall state-space, let x and u be the state and input of the system 10 with $$x := \begin{bmatrix} T \\ I_{aru}^d \\ I_{aru}^q \\ v_{dc}^2 \end{bmatrix}, \text{ and } u = \begin{bmatrix} \bar{T} \\ \bar{I}_{aru}^d \\ \bar{I}_{aru}^q \end{bmatrix}. \quad (5)$$

Combining equations (1), (2), and (4), we can now write down the full continuous-time state-space model 44 of the physical system 16, 26, 20, 24, 22, 28, 18 combined with the modulators 32, 34 as $$\dot{x} = A(t)x + \quad (6)$$

$$Bu = \begin{bmatrix} \kappa_{inu} & 0 & 0 & 0 \\ 0 & \kappa_{aru} & 0 & 0 \\ 0 & 0 & \kappa_{aru} & 0 \\ -\frac{3}{C_{dc}}\omega_r(t) & \frac{3}{C_{dc}}v_{pcc}^d(t) & 0 & 0 \end{bmatrix} x + \begin{bmatrix} \kappa_{inu} & 0 & 0 \\ 0 & \kappa_{aru} & 0 \\ 0 & 0 & \kappa_{aru} \\ 0 & 0 & 0 \end{bmatrix} u$$

The discrete-time version of the model (6) is given by $$x(t+1) = F(t)x(t) + G(t)u(t) \quad (7)$$

where $F(t) = e^{Ah}$ and $G(t) = \int_0^h e^{A(h-\eta)}Bd\eta$, which are the sampled data version of A and B, respectively, and h is the sampling period.

Switched Solver

Figure 3:
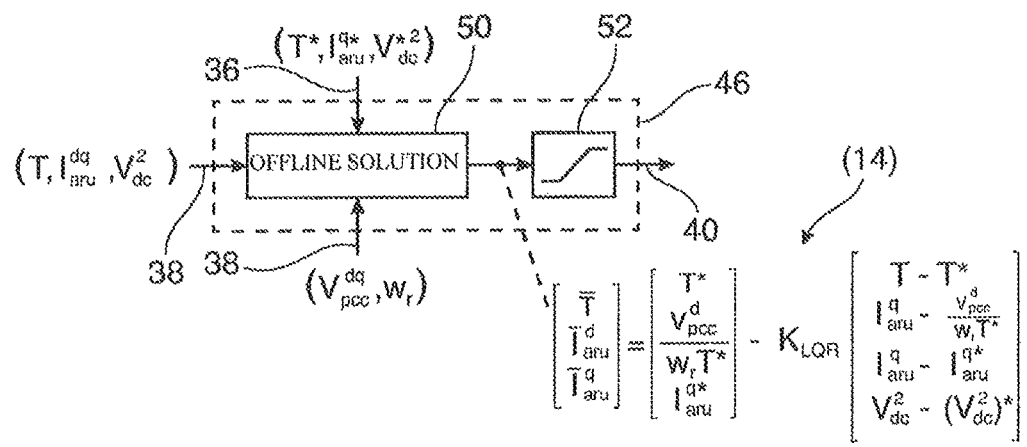
FIG. 3 schematically shows a controller according to an embodiment of the invention.

With respect to FIG. 3, the physical model 44 is solved by a switched solver 46 in the controller 30, which switches between different parameter sets for the offline solution 50 of equation (7) as described in detail below. The result is then passed through a limiter 52 to guarantee that the individual components of the reference control variables 40 do not violate the physical/safety constraints in the system.

The coordinated controller 30 and therefore the switched solver 46 receive two types of variables 36, 38: (i) the outer loop control variables 36 (which may be seen as references for the controller 30) and (ii) the estimated control variables, which may be seen as states of the system and which are either directly measured or estimated from measured data.

The outer loop variables 36 are $V^*_{dc}$, $T^*$, and $I_{aru}^{d*}$, i.e. the DC link set point to be tracked, the torque reference to be delivered, and the d current references for reactive power compensation, respectively.

The estimated control variables 38 are $V_{dc}$, $I_{aru}^{dq}$, $V_{pcc}^d$, and T, i.e. the DC link voltage, the dq current on the rectifier side, the d component of the voltage on the point 48 of common coupling between the converter/transformer and the source 16, and the electric torque on the inverter 22, respectively.

The reference control variables 40 that are produced by the controller 30 or 46 are T and $I_{aru}$, i.e. a reference torque for the inverter 22 and a current reference for the rectifier 20, respectively. The reference control variables 40 are then passed on to the lower level controllers/modulators 32, 34, which in turn issue the switch positions commands 42 to the semi-conductor devices.

Given the outer loop control variables 36 ($T^*$, $I_{aru}^{q*}$ and $v^*_{dc}$), the system dynamics should satisfy a steady-state condition according to the following algebraic condition: $0 = Ax_{ss} + Bu_{ss}$, from which it follows that we have the following steady-state point:

$$x_{ss} := \begin{bmatrix} T^* \\ \frac{v_{pcc}^d}{\omega_r T^*} \\ I_{aru}^{q*} \\ (V_{dc}^2)^* \end{bmatrix}, \text{ and } u_{ss} = \begin{bmatrix} T^* \\ \frac{v_{pcc}^d}{\omega_r T^*} \\ I_{aru}^{q*} \end{bmatrix}. \quad (8)$$

Using the steady-state operation point (8), we can write the error dynamics as $$x(t+1) - x_{ss} = F(t)(x(t) - x_{ss}) + G(t)(u(t) - u_{ss}) \quad (9)$$

This error system (8) is used as a constraint in the infinite-horizon LQR optimal control, which is solved next.

Offline Solution

Given a symmetric positive semi-definite matrix $Q_k = Q_k^T \geq 0$ and a symmetric positive-definite matrix $R_k = R_k^T > 0$, we can define the following infinite horizon cost function $$J_k = \sum_{i=0}^{\infty} \underbrace{\|x*(t+i) - x_{ss}\|_{Q_k}^2}_{\text{tracking}} + \underbrace{\|u(t+i) - u_{ss}\|_{R_k}^2}_{\text{control effort}} \quad (10)$$

The cost function has two terms, the first indicates deviations away from the steady-state $x_{ss}$ used for tracking and the second indicating the amount of control effort beyond the steady-state value $u_{ss}$.

We can choose among various matrix pairs to define the objective function $J_k$ in (10), for example, we can define ($Q_1$, $R_1$) and ($Q_2$, $R_2$) to indicate two modes of operation with different emphasis on tracking a certain state or penalizing heavily the changes in a certain input. In general, each matrix pair $(Q_k, R_k)$ defines different sets of control parameters that may be chosen with respect to different control objectives.

For any choice of $(Q_k, R_k)$ the following linear quadratic regulator (LQR) problem may be defined $$(LQR) \begin{cases} \min_u \; J_k = \sum_{i=0}^{\infty} \|x(t+i) - x_{ss}\|^2_{Q_k} + \|u(t+i) - u_{ss}\|^2_{R_k} \\ \text{s.t.} \quad \begin{aligned} x(t+1+i) - x_{ss} &= F(t)(x(t+i) - x_{ss}) + \\ & G(t)(u(t+i) - u_{ss}), \end{aligned} \quad \forall i \geq 0 \end{cases} \quad (11)$$

This results in the optimal and stabilizing LQR gain matrix $$K_{LQR,k} = -(R_k + G(t)^T P_k G(t))^{-1} G(t)^T P_k F(t), \quad (12)$$

where $P_k$ is a unique positive-definite solution to the discrete-time algebraic Riccati equation:

$$P_k = Q_k + F(t)^T P_k F(t) - F(t)^T P_k G(t)(R_k + G(t)^T P_k G(t)) G(t)^T P_k F(t) \quad (13)$$

For example, this solution is derived in the book by P. Dorato, V. Cerone, and C. Abdallah. "Linear Quadratic Control: An Introduction". Simon & Schuster, 1994.

Equation (13) provides an offline solution of the LQR problem (11), which may be encoded into the switched solver 46 as offline solution 50, for example in the form of a matrix equation, such as $$u_{LQR,k}(t) = \begin{bmatrix} \bar{T}(t) \\ \bar{I}^d_{aru}(t) \\ \bar{I}^q_{aru}(t) \end{bmatrix} = u_{ss} - K_{LQR,k}(x(t) - x_{ss}) \quad (14)$$

The result from (14), 50 may then be passed through the limiter 52.

Parameter Switching

Figure 4:
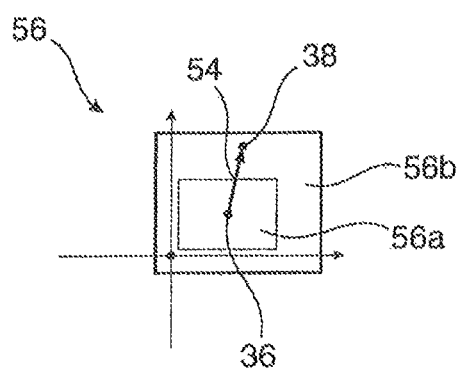
FIG. 4 schematically shows control regions used in a control method according to an embodiment of the invention.

FIG. 4 schematically shows the state space 56 of the system 10. The difference between the steady-state $x_{ss}$, $u_{ss}$ defined by the outer loop control variables 36 and the estimated control variables 38 may be seen as a controller error 54, which has to be minimized by the controller 46.

The state-space 56 may be subdivided into different control regions 56a, 56b, which may be nested in each other and/or may contain the steady-state point 36. When the current operation point state 38 is within a specific region 56a, 56b, it may be assigned to a specific operation mode of the system 10.

Dependent on the control region, the controller 46 now may choose different control parameters, for example by choosing matrix pairs $(Q_k, R_k)$ with different coefficients in equation (14).

For example, when close to 36, the state 38 lies in the region 56a. In this region, a first LQR control gain $K_{LQR,1}$ may be used that is obtained by solving the problem (11) with the matrix pair $(Q_1, R_1)$. However, when the state 38 exists from region 56a to region 56b, then we use the LQR control gain $K_{LQR,2}$ that is obtained by solving the problem (11) with the matrix pair $(Q_2, R_2)$. As such, the solver 46 switches between these two LQR-based solutions.

The switched controller 30 provides a huge leverage in shaping the response of the system based on prior knowledge on how fast one would like to respond of the closed-loop system to be along a certain state. For example, if the DC voltage $V_{dc}$ should be brought down very fast to its nominal value, then the coefficients in the matrix $Q_k$ may be tilted to allow the part of the control that affects the DC voltage to become cheap, i.e., decrease the corresponding weights in the $R_k$ matrix.

For example, the switched controller 30 may be switched between a normal mode and an emergency mode. The normal mode may be characterised by a DC link voltage, which is neither too high nor too low with respect to the reference. The emergency mode may be characterised by a DC link voltage that has exceeded a certain threshold (set by design) and both reference control variables $\bar{T}$ and $\bar{I}_{aru}^d$ are allowed to change a lot from their steady-state values.

Control Method

Figure 5:
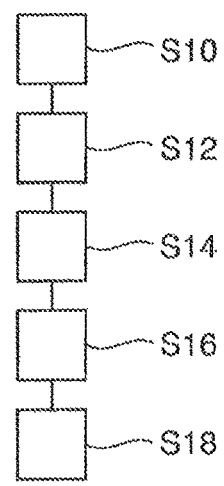
FIG. 5 shows a flow diagram for a control method according to an embodiment of the invention.

FIG. 5 summarizes the steps of the control method for controlling the electrical system 10 that may be performed by the controller 14 as described in detail above.

In step S10, measurement data is obtained in the system 10 and the estimated control variables 38 are determined and input to the controller 14.

In step S12, the controller 14 receives the outer loop control variables 36 and determines the control error 54 based on the difference between the control variables 38 and 36.

In step S14, the controller 14 determines the control region 54a, 56a based on the control error 54. Based on the determined control region 54a, 54b, the controller 14 selects one or more controller parameters, for example a specific set of matrices $(Q_k, R_k)$ for the cost function 10.

In step S16, the controller 14 determines the reference control variables 40. The control variables 36, 38 and the selected control parameters $(Q_k, R_k)$ are input into equation (14) and the reference control variables 40 are calculated from equation (14). Optionally, hard limits are set by the limiter 46.

In step S18, the reference control variables 40 are sent to the modulators 32, 34, which determined switching sequences/positions 42 for the rectifier 20 and the inverter 22.

The steps of the method may be repeated in every time-step of the controller 14.

Applications

Figure 6:
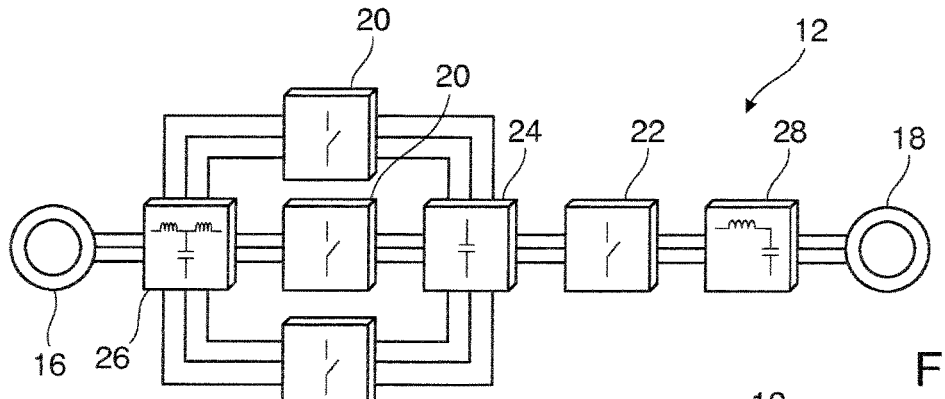
FIG. 6 schematically shows an electrical converter system according to a further embodiment of the invention.
Figure 7:
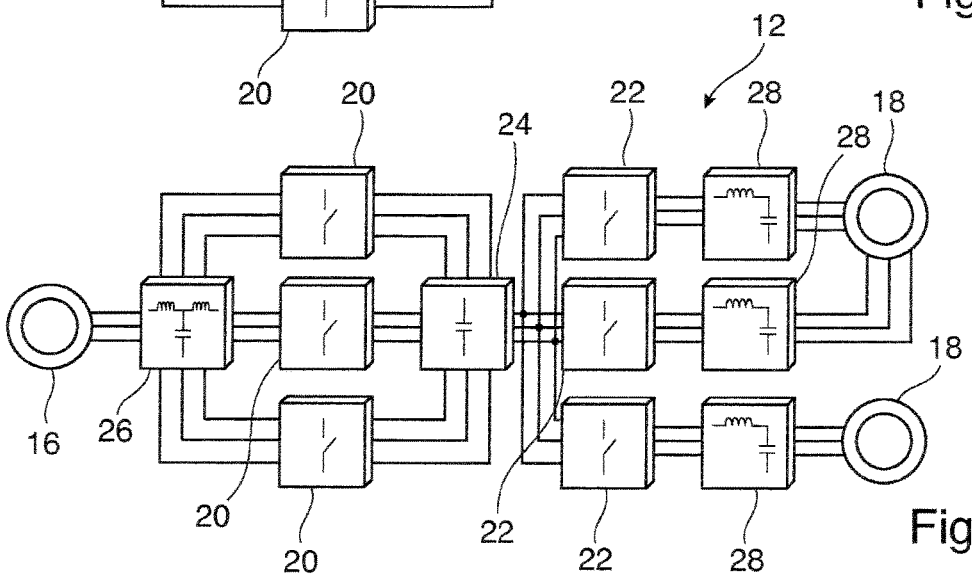
FIG. 7 schematically shows an electrical converter system according to a further embodiment of the invention.
Figure 8:
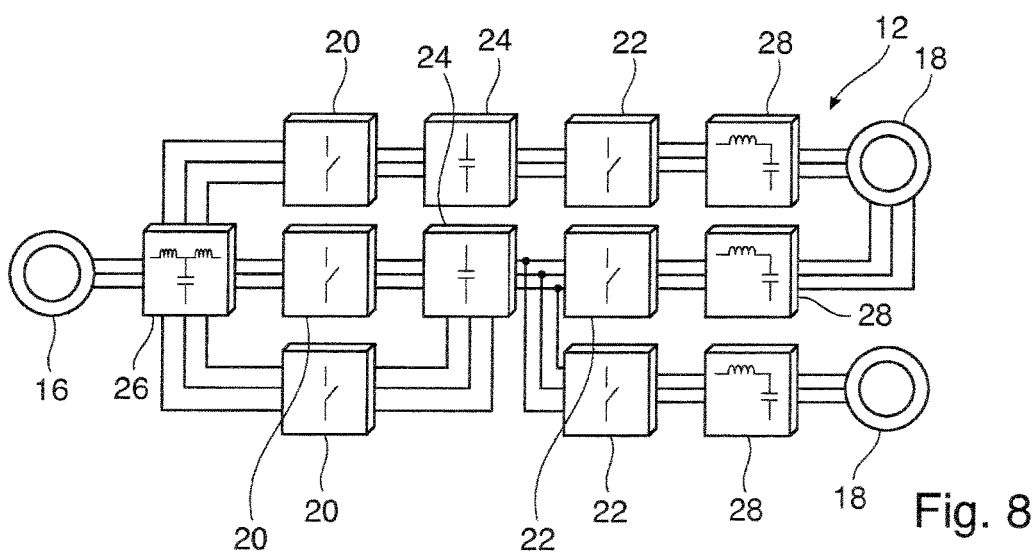
FIG. 8 schematically shows an electrical converter system according to a further embodiment of the invention.

FIGS. 6 to 8 show possible configurations of electrical converters 12 that may be controlled with the control method and controller as described above.

FIG. 6 shows a converter 12 with multiple rectifiers 20 and an inverter 22. The rectifiers 20 are connected in parallel to the input filter and/or an electric transformer 26 and the DC link 24.

The converter 12 of FIG. 7 (additionally to the parallel rectifiers 20) comprises multiple inverters 22, which are connected at their input side in parallel to the DC link 24. Every inverter 20 is connected to a dedicated output filter 28 at its output side. Furthermore, two inverters 28 are connected to one electrical load 18 in parallel. The electrical load 18 may be a doubly-fed machine.

Additionally to the configuration of FIG. 7, the converter 12 in FIG. 8 has two DC links 24. One DC link 28 is connected to two multiple rectifiers 20 and multiple inverters 20. The load 18 is connected via a first inverter 22 with the first DC link and via another inverter to the other DC link.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 electrical converter system
12 electrical converter
14 controller
16 electrical source
18 electrical load
20 active rectifier
22 inverter
24 DC link
26 input filter and/or electric transformer
28 output filter
30 coordinated controller
32 rectifier modulator
34 inverter modulator
36 outer loop control variables
38 estimated control variables
40 reference control variables
42 switching positions
44 physical model
46 switched solver
48 connection point, point of common coupling
50 offline solution
52 limiter
54 control error
56 state-space
56a control region
56b control region

The invention claimed is:

1. A method for controlling an electrical converter, the electrical converter comprising at least one of an active rectifier and an inverter interconnecting an electrical source with an electrical load;
the method comprising:
receiving at least one estimated control variable, which is estimated from measurement values measured in the electrical converter;
receiving at least one outer loop control variable provided by an outer control loop, the at least one outer loop control variable providing a desired steady-state operation point of the electrical converter;
determining a control region based on a control error, which is a difference between the at least one estimated control variable and the at least one outer loop control variable, wherein the control region is defined by one or more intervals of one or more control variables;
selecting control parameters based on the control region, whereby each control region has the same calculation scheme, wherein, when the control error is in an inner control region, first control parameters are selected, and, when the control error is outside the inner control region but inside an outer control region, second control parameters are selected;
switching, based on the control error, between two and more control methods, which differ in control parameters, whereby control parameters are assigned to each control region, by predicting at least one reference control value based on a solution of a physical model of the electrical converter, which comprises the selected control parameters, the physical model being based on differential equations modelling the at least one estimated control variable and the solution being based on a constraint minimizing a difference between the at least one estimated control variable and the at least one outer loop control variable; and
determining switching states of the electrical converter based on the reference control value.

2. The method of claim 1,
wherein the physical model provides a linear quadratic problem and the solution of the physical model was determined offline by algebraically solving the linear quadratic problem.

3. The method of claim 2, wherein the solution is a matrix equation for the at least one reference control variable, the matrix equation being dependent on the at least one outer loop control variable, the estimated control variable and the control parameters.

4. The method of claim 2, wherein the control region is selected from a set of nested control regions, surrounding a steady-state operation point defined by the outer loop control variable.

5. The method of claim 2, wherein the control region is selected from at least two control regions comprising a normal mode control region and an emergency mode control region, in which a DC link voltage has exceeded a predefined threshold value.

6. The method of claim 2, wherein the at least one estimated control variable comprises an estimated rectifier control variable and an estimated inverter control variable, the at least one outer loop control variable comprises an outer loop rectifier control variable and an outer loop inverter control variable, and the at least one reference control variable comprises a reference rectifier control variable and a reference inverter control variable; and/or
wherein the at least one estimated control variable comprises an estimated rectifier current and an estimated torque, the at least one outer loop control variable comprises an outer loop rectifier current and an outer loop torque, and the at least one reference control variable comprises a reference rectifier control current and a reference torque.

7. The method of claim 2, wherein the physical model is based on at least a first order differential equation of a current through the active rectifier, at least a first order differential equation of a torque associated with the electrical load, and a first order differential equation of a DC link voltage.

8. The method of claim 2, wherein the at least one reference control variable is input to at least one modulator, which generates switching positions of the active rectifier from a reference rectifier control variable and/or which generates switching positions of the inverter from a reference inverter control variable.

9. The method of claim 1,
wherein the solution is a matrix equation for the at least one reference control variable, the matrix equation being dependent on the at least one outer loop control variable, the estimated control variable and the control parameters.

10. The method of claim 1,
wherein the control region is selected from a set of nested control regions, surrounding a steady-state operation point defined by the outer loop control variable.

11. The method of claim 1,
wherein the control region is selected from at least two control regions comprising a normal mode control region and an emergency mode control region, in which a DC link voltage has exceeded a predefined threshold value.

12. The method of claim 1,
wherein the at least one estimated control variable comprises an estimated rectifier control variable and an estimated inverter control variable, the at least one outer loop control variable comprises an outer loop rectifier control variable and an outer loop inverter control variable, and the at least one reference control variable comprises a reference rectifier control variable and a reference inverter control variable; and/or
wherein the at least one estimated control variable comprises an estimated rectifier current and an estimated torque, the at least one outer loop control variable comprises an outer loop rectifier current and an outer loop torque, and the at least one reference control variable comprises a reference rectifier control current and a reference torque.

13. The method of claim 1,
wherein the physical model is based on at least a first order differential equation of a current through the active rectifier, at least a first order differential equation of a torque associated with the electrical load, and a first order differential equation of a DC link voltage.

14. The method of claim 13,
wherein the first order differential equation of the DC link voltage is a linear equation in an estimated voltage in a connection point of the electrical converter to the source and in an estimated speed associated with the electrical load; and/or
wherein the first order differential equation of the DC link voltage is based on a difference between a power flow through the rectifier and a mechanical and/or electrical power flow corresponding to the load.

15. The method of claim 1,
wherein the at least one reference control variable is input to at least one modulator, which generates switching positions of the active rectifier from a reference rectifier control variable and/or which generates switching positions of the inverter from a reference inverter control variable.

16. An electrical converter controller comprising:
a processor; and
a non-transitory computer readable medium structured to store instructions that when executed by the processor are effective to:
receive at least one estimated control variable, which is estimated from measurement values measured in an electrical converter comprising at least one of an active rectifier and an inverter interconnecting an electrical source with an electrical load,
receive at least one outer loop control variable provided by an outer control loop, the at least one outer loop control variable providing a desired steady-state operation point of the electrical converter,
determine a control region based on a control error, which is a difference between the at least one estimated control variable and the at least one outer loop control variable, wherein the control region is defined by one or more intervals of one or more control variables,
select control parameters based on the control region, whereby each control region has the same calculation scheme, wherein, when the control error is in an inner control region, first control parameters are selected, and, when the control error is outside the inner control region but inside an outer control region, second control parameters are selected,
switch, based on the control error, between two and more control methods, which differ in control parameters, whereby control parameters are assigned to each control region, by predicting at least one reference control value based on a solution of a physical model of the electrical converter, which comprises the selected control parameters, the physical model being based on differential equations modelling the at least one estimated control variable and the solution being based on a constraint minimizing a difference between the at least one estimated control variable and the at least one outer loop control variable, and
determine switching states of the electrical converter based on the reference control value.

17. A converter system, comprising:
an electrical converter comprising at least one of an active rectifier for converting an AC current from an electrical source into a DC current and an inverter for converting the DC current into an AC current to be supplied to an electrical load; and
an electrical converter controller comprising:
a processor;
a non-transitory computer readable medium structured to store instructions that when executed by the processor are effective to:
receive at least one estimated control variable, which is estimated from measurement values measured in the electrical converter,
receive at least one outer loop control variable provided by an outer control loop, the at least one outer loop control variable providing a desired steady-state operation point of the electrical converter,
determine a control region based on a control error, which is a difference between the at least one estimated control variable and the at least one outer loop control variable, wherein the control region is defined by one or more intervals of one or more control variables,
select control parameters based on the control region, whereby each control region has the same calculation scheme, wherein, when the control error is in an inner control region, first control parameters are selected, and, when the control error is outside the inner control region but inside an outer control region, second control parameters are selected,
switch, based on the control error, between two and more control methods, which differ in control parameters, whereby control parameters are assigned to each control region, by predicting at least one reference control value based on a solution of a physical model of the electrical converter, which comprises the selected control parameters, the physical model being based on differential equations modelling the at least one estimated control variable and the solution being based on a constraint minimizing a difference between the at least one estimated control variable and the at least one outer loop control variable, and
determine switching states of the electrical converter based on the reference control value.

18. The converter system of claim 17, further comprising at least one of:
   a DC link;
   at least one input filter and/or at least one transformer interconnecting the active rectifier with the electrical source;
   an output filter interconnecting the inverter with the electrical load.

19. The converter system of claim 18, further comprising at least one of:
   at least two active rectifiers connected in parallel between an input filter and/or a transformer and a DC link;
   at least two inverters connected in parallel to a DC link;
   at least two parallel DC links, wherein each DC link is cascade connected between the at least one active rectifier and inverter.

20. The converter system of claim 17, further comprising at least one of:
   at least two active rectifiers connected in parallel between an input filter and/or a transformer and a DC link;
   at least two inverters connected in parallel to a DC link;
   at least two parallel DC links, wherein each DC link is cascade connected between the at least one active rectifier and inverter.

* * * * *